Figure 1:
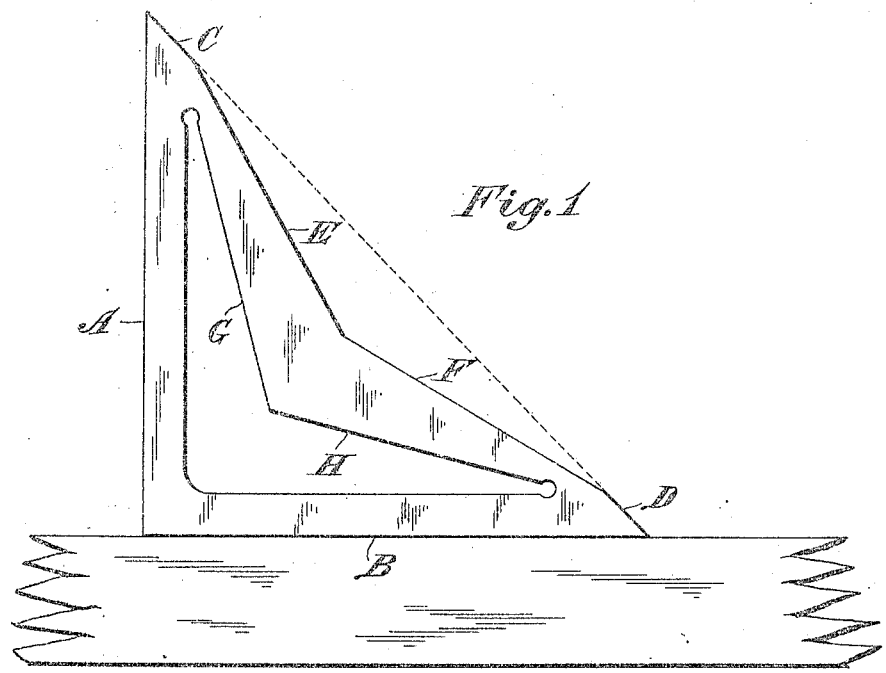

F. S. CRISPIN.
DRAFTSMAN'S TRIANGLE.
APPLICATION FILED MAY 2, 1912.

1,032,533.

Patented July 16, 1912.

WITNESSES:
Lillian H. Neveil
H. I. S. Painter

INVENTOR:
FREDERIC S. CRISPIN
BY
Jas. C. Wolcansmith
ATTORNEY.

UNITED STATES PATENT OFFICE.

FREDERIC S. CRISPIN, OF PHILADELPHIA, PENNSYLVANIA.

DRAFTSMAN'S TRIANGLE.

1,032,533.  Specification of Letters Patent.  Patented July 16, 1912.

Application filed May 2, 1912. Serial No. 694,654.

*To all whom it may concern:—*

Be it known that I, FREDERIC S. CRISPIN, a citizen of the United States, residing at Philadelphia, in the county of Philadelphia and State of Pennsylvania, have invented certain new and useful Improvements in Draftsmen's Triangles, of which the following is a specification.

My invention relates to draftsmen's triangles, that is to say, to a device for laying out and measuring angles on the drawing board.

The principal object of my invention is to provide a drawing instrument for laying out and measuring angles, whereby all angles which are multiples of 15° may be drawn with a single instrument instead of requiring the two triangles as now commonly used for this purpose.

I am aware that several forms of instruments have heretofore been used for the foregoing purpose, but these instruments were more or less inconvenient being unsymmetrical and causing considerable confusion in the use of the same, and some types requiring the more important angles to be drawn on the under side of the instrument, which frequently causes inaccuracies which are unperceived at the time.

My invention contemplates a thin flat piece of wood, hard rubber, celluloid or other suitable material, the working edges of which are arranged at suitable angles whereby the draftsman can lay out or measure any angle which is a multiple of 15° with the greatest possible ease and convenience.

The nature and characteristic features of my invention will be more readily understood from the following description taken in connection with the accompanying drawings forming part hereof, in which—

Figure 2:
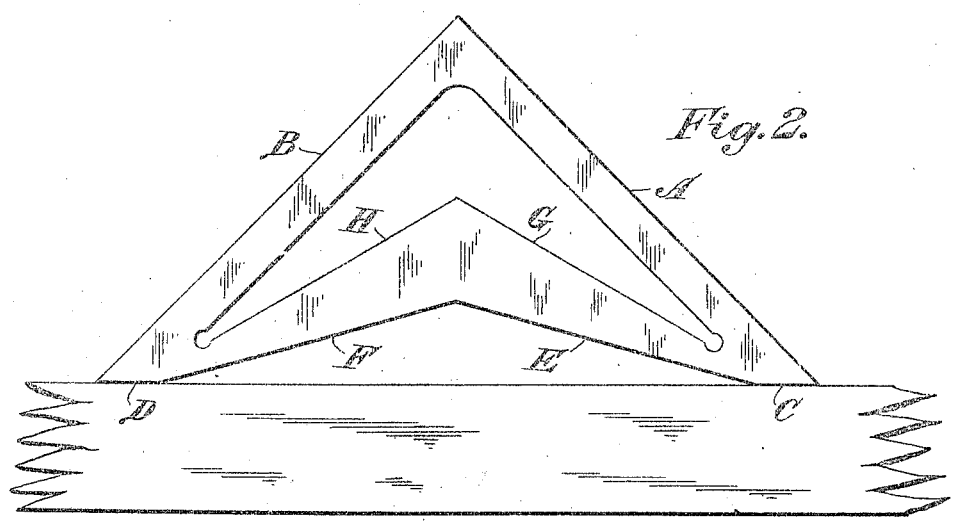

Figure 1 is a plan view of a draftsman's triangle embodying the main features of my present invention, the same being shown in one position on the working edge of a T square blade or other straight edge; and Fig. 2 is a similar view but with the instrument shown in another position.

Referring to the drawings, in the particular embodiment of my invention there shown, the instrument comprises a thin flat piece of wood, hard rubber, celluloid or other suitable material having six outer working edges A, B, C, D, E, and F. The edges A and B are at right angles or 90° to each other and the entire instrument is preferably symmetrical about a line bisecting the angle formed by these edges. The edges C and D are respectively arranged at angles of 45° with the edges A and B and are in alinement with each other. The edges E and F are each arranged at an angle of 15° with an imaginary line connecting the edges C and D and consequently are respectively arranged at angles of 165° to said edges C and D and at an angle of 310° (or 150) to each other.

It will be seen that all angles which are multiples of 15° (with the exception of 75° to the horizontal) may be laid out by the use of the instrument as so far described in connection with the T square in its normal position by causing the instrument to occupy either the position shown in Figs. 1 and 2 or by turning the instrument over on its other face. For example with the instrument in the position as shown in Fig. 1, the angle of 90° to the horizontal may be drawn along the edge A, while the angle of 30° to the horizontal may be drawn along the edge F, and the angle of 60° to the horizontal may be drawn along the edge E. With the instrument in the position as shown in Fig. 2, the two 45° lines may be drawn along the edges A and B respectively while the two 15° lines may be drawn along the edges E and F respectively. To lay out the 75° line by the employment of the instrument so far described, a 15° line may be first laid out in any arbitrary or convenient location and by shifting the instrument to bring one of the edges A or B in alinement with the arbitrary 15° line before drawn and then shifting the instrument along the straight edge which for the purpose of guiding is brought into conjunction with the edges C and D, the 75° line may be drawn at the desired location by using the respective other edge B or A as the case may be. This manner of using a triangle is well known to those skilled in the art and need not be further elaborated upon.

As before stated all of the angles which are multiples of 15° may be drawn solely by the use of the outside edges of the instrument, but it will be noted that to do so results in the necessity of considerable manipulation of the instrument and straight edge for drawing the 75° lines. To obviate this inconvenience, and to render the instrument more convenient in other respects it is preferably cut out at its center and is provided with two interior working edges G and H which are at an angle of 120° (or 240°) to each other and at angles of 15° to the outside edges A and B respectively, at angles of 30° to the edges C and D respectively, and at angles of 15° to the edges E and F respectively. By the employment of the inside edges G and H of the instrument in the position as shown in Fig. 1, the angle of 75° to the horizontal may be drawn by the edge G and the angle of 15° to the horizontal may be drawn by the edge H, while with the instrument in the position as shown in Fig. 2, the edges G and H may be used to draw the angles of 30° to the horizontal. Where the inside edges G and H are provided the outside edges E and F may be omitted as indicated in dotted lines in Fig. 1. In this instance the outside edges C and D are continued in and form a single edge and the outline of the instrument would be the same as the 45° triangle in common use.

There is thus provided a simple, inexpensive and symmetrical single instrument whereby all angles which are multiples of 15° may be drawn without the confusion to the draftsman which has heretofore resulted in the use of those instruments where the functions of the two common 45° and 60° triangles have been combined in a single instrument.

Having thus described the nature and characteristic features of my invention what I claim as new and desire to secure by Letters Patent is:—

1. A drawing instrument comprising a thin flat piece of suitable material having a pair of outside edges at an angle of 90° to each other, another pair of outside edges in alinement with each other and respectively at angles of 45° to the first named pair of edges, and a third pair of outside edges at an angle of 310° to each other and respectively at angles of 165° to the second named pair of edges.

2. A drawing instrument comprising a thin flat piece of suitable material having a pair of outside edges at an angle of 90° to each other, another pair of outside edges in alinement with each other and respectively at angles of 45° to the first named pair of edges, and a third pair of outside edges at an angle of 310° to each other and respectively at angles of 165° to the second named pair of edges, and having its central portion cut out and provided with a pair of interior working edges arranged at an angle of 240° to each other and respectively at angles of 15° to the first named pair of outside edges.

3. A drawing instrument comprising a thin flat piece of suitable material having a pair of outside edges at an angle of 90° to each other, another outside edge at angle of 45° to each of the first named pair of edges, and the instrument being cut out at its central portion and provided with a pair of interior working edges arranged at an angle of 240° to each other and respectively at angles of 15° to the first named pair of outside edges.

In testimony whereof, I have hereunto signed my name in the presence of two witnesses.

FREDERIC S. CRISPIN.

Witnesses:
  LILLIAN H. NEREIL,
  ELIZABETH J. BLOOMER.